Deacon & Russell,
Piston Packing.
No. 109,722.  Patented Nov. 29, 1870.

Witnesses:  Inventor:

United States Patent Office.

SAMUEL DEACON AND JOHN RUSSELL, OF LAWRENCE, MASSACHUSETTS.

Letters Patent No. 109,722, dated November 29, 1870.

IMPROVEMENT IN PACKING-BOXES FOR ROTARY STEAM-CYLINDERS.

The Schedule referred to in these Letters Patent and making part of the same.

*To all whom it may concern:*

Be it known that we, SAMUEL DEACON and JOHN RUSSELL, of Lawrence, in the county of Essex and State of Massachusetts, have invented a new and improved Packing-Box for Rotary Steam-Cylinders; and we do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
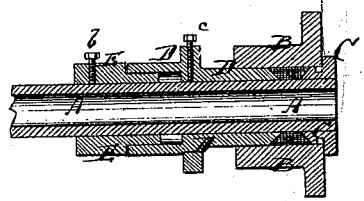
Figure 1 represents a longitudinal section of our improved packing.
Figure 2:
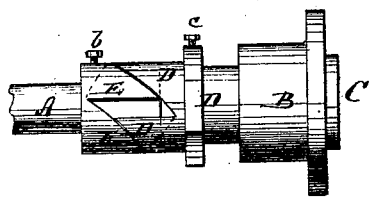
Figure 2 is a side view of the same.

This invention relates to a new packing-box for revolving steam-cylinders, and consists in the arrangement of a nut that serves to clamp the packing between two cones, and which, instead of working on a screw-thread, is moved longitudinally by contact with a fixed cam, as hereinafter more fully described.

A in the drawing represents the tubular stationary shaft of a rotary steam-cylinder.

B is the stuffing-box, secured by bolts to one end of the cylinder so as to embrace the shaft A.

On the inner end of the tube, close to the cylinder, within the box B, is secured a stationary sleeve, C, with a conical outer end.

D is the nut for crowding the packing $a$ against the cone C.

The inner end of this nut is also beveled, to be conical, as shown in fig. 1, so that the packing is clamped between the two conical ends.

The outer end of the nut is enlarged, and fits over part of a tube, E, which is, by a screw, $b$, locked to the shaft A.

The tube E constitutes a stationary cam having projecting spiral cam-edges, as shown, against which similar edges of the nut D abut.

When the tube E has been secured to the shaft A, the nut can be turned, and will, on the cam-edge, be moved against the packing, to securely clamp the same. It can then be locked by a screw, $c$. When necessary, the nut can again be turned, to clamp the packing still firmer, and locked again.

Having thus described our invention,

We claim as new and desire to secure by Letters Patent—

The nut D, adjusted on the cam E, and arranged to clamp the packing between two conical ends, substantially as herein shown and described.

SAMUEL DEACON.
JOHN RUSSELL.

Witnesses:
JOHN DARBY,
REUBEN HAYMAN.